March 3, 1942.  A. C. WILCOX  2,274,914
ELECTRIC FLOUR SIFTER
Filed July 12, 1940  2 Sheets-Sheet 1

Inventor
Albert C. Wilcox
By Frease and Bishop
Attorneys

March 3, 1942.　　A. C. WILCOX　　2,274,914
ELECTRIC FLOUR SIFTER
Filed July 12, 1940　　2 Sheets-Sheet 2

Inventor
Albert C. Wilcox
By Frease and Bishop
Attorneys

Patented Mar. 3, 1942

2,274,914

UNITED STATES PATENT OFFICE 2,274,914

ELECTRIC FLOUR SIFTER

Albert C. Wilcox, East Liverpool, Ohio

Application July 12, 1940, Serial No. 345,110

5 Claims. (Cl. 209—347)

The invention relates to flour sifters and more particularly to a sifter having a reciprocating sieve or screen operated by an electromagnet.

An object of the invention is to provide an electric flour sifter having a vertically disposed electromagnet centrally located within the shell of the sifter, the vertically reciprocating core of the magnet having its lower end centrally supporting a sieve or screen in the lower portion of the shell and adapted to rapidly vibrate the same.

A further object is to provide an electric flour sifter of this type in which a make-and-break device is automatically operated by the reciprocating core of the magnet.

A still further object is to provide a flour sifter of this type in which an armature carried by the reciprocating core strikes positive stops at opposite ends of its travel.

Another object is to provide such a flour sifter in which the periphery of the sieve or screen strikes a positive stop at the end of its upward movement.

Still another object of the invention is to provide an electric flour sifter in which a flexible rubber diaphragm is connected to the reciprocating core of the magnet and sealed to the lower end of the shell or housing enclosing the magnet.

Figures 1, 2, 3:
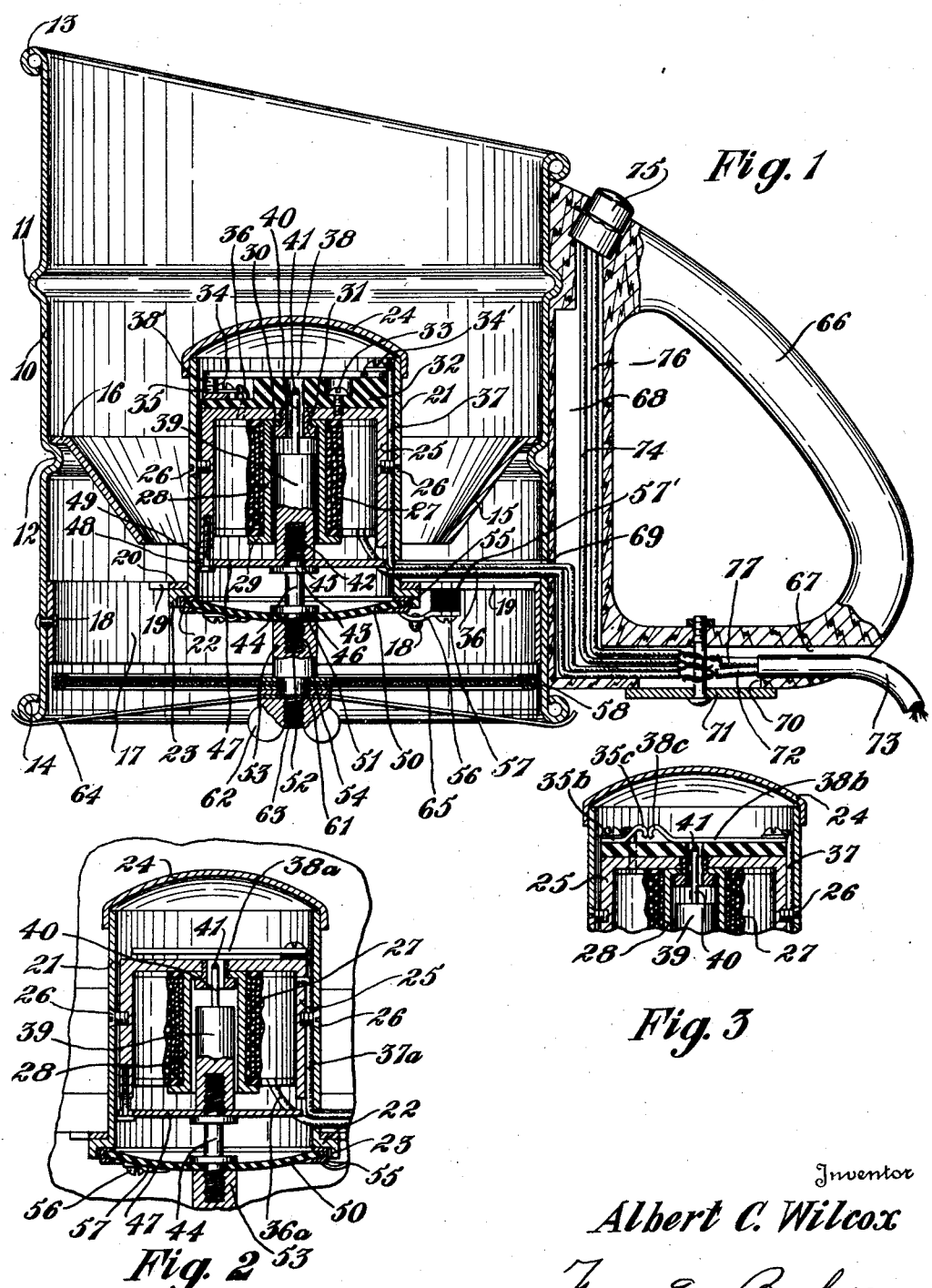
Figure 4:
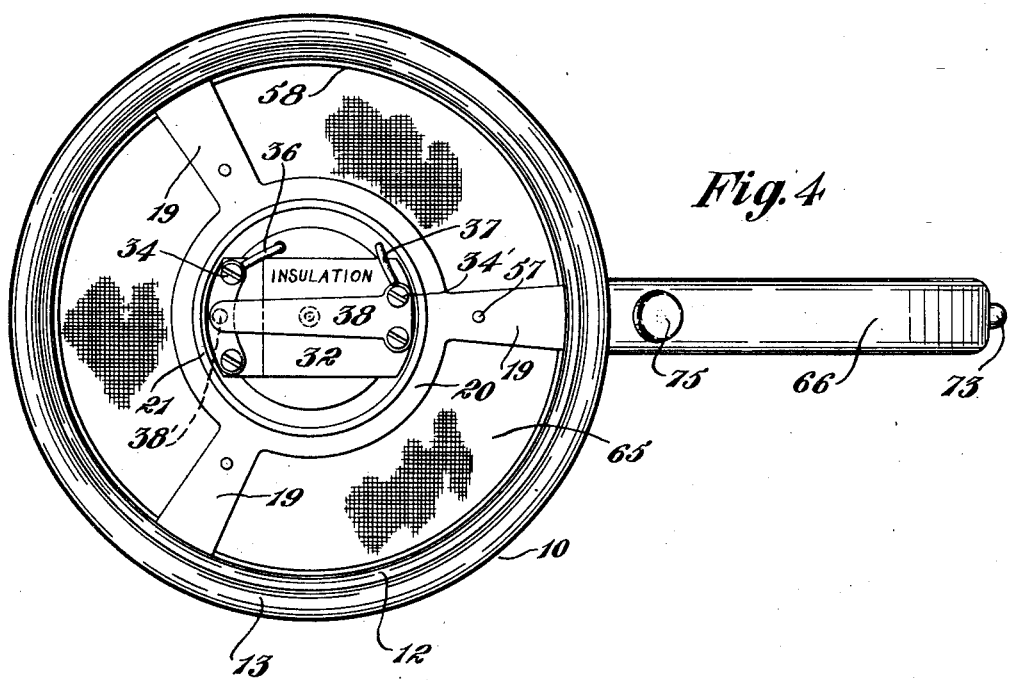
Figure 5:
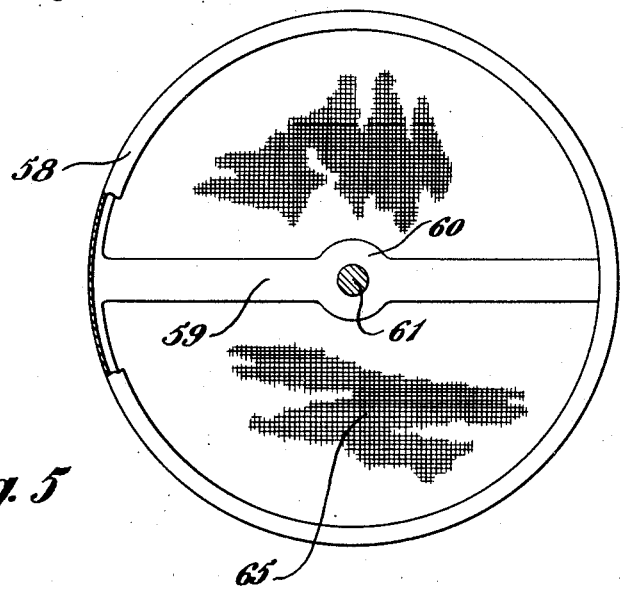

The above objects together with others which will be apparent from the drawings and following description or which may be later referred to, may be attained by constructing the improved electric flour sifter in the manner illustrated in the accompanying drawings in which Figure 1 is a vertical sectional view through an electric flour sifter embodying the invention;

Fig. 2, a fragmentary vertical sectional view through a modified form of electromagnet;

Fig. 3, a fragmentary sectional view through the upper portion of the electromagnet showing a modified form of make-and-break;

Fig. 4, a top plan view of the improved flour sifter with the cap removed from the magnet housing or shell; and Fig. 5, a plan view of the sieve or screen.

Similar numerals refer to similar parts throughout the several views.

The improved flour sifter includes a substantially cylindric vertical shell 10 which may be formed of sheet metal or other suitable material preferably provided with an outwardly disposed peripheral bead or rib 11 near its upper end and an inwardly disposed bead or rib 12 at a point spaced below the bead 11.

The upper end of the shell 10 may be cut off at an angle as in usual practice and provided with the rim bead 13 and the lower end of the shell may be provided with the usual rim bead 14.

A funnel shaped inner shell 15 is provided at its upper end with the outturned peripheral flange 16 which rests upon the inwardly disposed rib or bead 12 in the shell 10.

Below the funnel shaped shell 15 is located a metal ring 17 which may be connected to the shell 10 as by rivets 18.

This ring is in the form of a spider, having a plurality of radially disposed arms or spokes 19 to the inner ends of which is formed a ring 20 for supporting the magnet which operates the sieve or screen.

The outer shell or housing 21, for the magnet, may be formed of aluminum or other sheet metal and fits snugly within the ring 20 having at its lower end the outturned peripheral flange 22 fitting against the underside of the ring 20 and terminating in the downturned annular flange 23.

The cap 24 may be provided upon the upper end of the magnet housing or shell 21.

The magnet includes the U-shaped field piece 25 formed of soft iron and connected to the magnet housing or shell 21 as by screws 26.

The magnet coil 27 is mounted within the field piece 25 by means of the central tubular shell 28 preferably formed of brass and having an outturned flange 29 at its lower end engaging the lower end of the coil and an inturned flange 30 at its upper end which is held in engagement with the top of the field piece 25 as by the hollow threaded stud 31.

An insulation block 32 is fixed upon the top of the field piece 25 as by the screw 33 and has mounted on one end as by the binding screw 34, a fixed contact 35 connected as by said binding screw to one wire 36 of the electric circuit.

A spring contact arm 38 is connected to the other side of the insulation block 32 as by the binding screw 34' which also connects said spring contact arm to the wire 37.

The movable contact 38' upon the free end of the spring arm 37 is adapted to contact with the fixed contact 35.

A soft iron core 39 is mounted for vertical reciprocation within the brass tube 28 of the magnet coil and is provided at its upper end with a finger 40 having an insulation point 41 adapted to strike the spring contact arm 37 and raise the same to break the contact at 38'—35 on each up-stroke of the core 39.

The lower end of the soft iron core 39 is provided with a threaded bore 42 which receives the upper threaded end 43 of a double ended threaded stud 44 provided with spaced shoulders 45 and 46.

The armature 47 is attached to the lower end of the core 39 by means of this stud, the shoulder 45 on the stud being located beneath the armature.

This armature is so located that on the upstroke of the core the ends of the armature will strike the lower ends of the field piece 25.

To limit the downward movement of the core, the one end of the armature may be provided with a notch 48 to accommodate the stop screw 49, the armature striking the head of said screw limiting the downward movement thereof.

The core and armature are assembled to the magnet by means of a flexible rubber diaphragm 50 having a central opening 51 which receives the lower threaded end 52 of the double ended threaded stud 44.

A stud 53 having a threaded bore 54 in its upper end receives the threaded portion 52 of the stud 44 and clamps the rubber diaphragm 50 between the shoulder 46 and the stud 53.

The periphery of the flexible diaphragm 50 is sealed within a channel shaped ring 55 which is held clamped against the flange 22 of the magnet housing by means of the clamping clips 56 mounted in spaced relation beneath the arms or spokes 19 by the screws 57 and extension blocks 57'.

This rubber diaphragm 50 thus supports the core 39 and assembled parts relative to the magnet, and lends itself to easy adjustment to compensate for any movement or length of stroke that may be required.

The diaphragm also acts as a seal to completely seal the magnet housing and prevent the fine flour from sifting into the magnet and getting into any of the mechanical parts of the device.

The sieve or screen comprises a channel shaped metal ring 58 having the radial arms or spokes 59 with a hub portion 60 formed at the center to receive the reduced portion 61 of the stud 53.

A thumb screw 62 may be provided upon the threaded extension 63 of the stud 53 for clamping the sieve and the leaf spring 64 thereon.

A wire screen 65 of suitable mesh is carried by the ring frame 58, the periphery of the wire being clamped within the channel of said ring.

The outer ends of the leaf spring 64 are engaged under the lower rim bead 14 of the shifter shell so that the core and sieve assembly is normally urged to the lower position as shown in Figure 1.

The sieve may be so mounted that on the upstroke of the core the ring 58 of the sieve will strike the ring 17.

The handle 66 may be of Bakelite or other suitable insulation material and is provided with a passage 67 running horizontally through its lower portion and communicating with the vertical passage 68.

The opening 69 through the inside of the handle and through the shell 10 permits the wires 36 and 37 to pass from the magnet into the passage 68 and thence to the passage 67.

An opening 70 may be formed in the lower side of the passage 67 to permit the wires to be connected after which a plate 71 of metal or the like may be attached over said opening by any suitable means.

The manner of connecting the wires is shown in Fig. 1 in which the wire 36 from the magnet is connected adjacent to the opening 70 to one of the lead wires 72 which enter the outer end of the passage 67 through the usual flexible cord 73 which may be provided with the conventional attaching plug for connection to a base receptacle or socket.

The wire 37 is connected adjacent to the opening 70 in the handle to a wire 74 leading up through the passage 68 to the push button switch 75, a wire 76 leading from said switch down through the passage 68 and through the passage 67 to a point adjacent the opening 70 where it is connected to the other lead wire 77.

In the operation of the improved flour sifter the desired amount of flour is placed within the shell 10, the tapered conical shell 15 holding the bulk of the weight of the flour so that it will not rest upon the sieve, thus, not overtaxing the magnet.

The flour sifts down between the lower end of the conical shell 15 and the magnet housing 21 onto the screen.

When the switch button 75 is depressed, the magnet is energized quickly pulling the core 39 upward. As the core reaches its upper limit the insulation point 41 thereon strikes the spring contact arm 38 breaking the contact.

The ends of the armature 47 strike the lower ends of the field piece 25 and the sieve ring 58 strikes the lower edge of the ring 17 and as the magnet is de-energized by breaking of the circuit the spring 64 quickly throws the core, armature and sieve assembly down to the normal position shown in Fig. 1 at which time the spring contact arm 38 again makes contact.

This operation continues rapidly vibrating the sieve so as to sift the flour therethrough.

The stroke can be lengthened or shortened by changing the distance between the lower end of the field piece 25 and the head of the stop screw 49 and also by changing the thickness and flexibility of the spring contact strip 38.

In Fig. 2 is shown a slight modification in which the make-and-break in the circuit is eliminated, the wires 36a and 37a being connected directly to the magnet and the spring strip 38a, being provided merely to be struck by the insulation point 41 upon the upper stroke of the core 39.

This construction gives fairly good results, but is not completely satisfactory for use with the hard type flour which is milled many times finer than the ordinary flour. This is for the reason that there is not enough throw to the armature to properly work with this hard type flour which has a tendency to cake rather than to sift through the sieve if not thrown up quite a distance off of the sieve with each vibration thereof.

In Fig. 3 is shown a modification of the make-and-break device in which the spring arm 38b has a curved end 38c adapted to wipe against the curved end 35c of the contact 35b.

The reason for this curved, wiping arrangement of make-and-break device will be obvious, as by having a wiping or scraping action between the contacts will keep the contacting surfaces clean and smooth, and will prevent the fouling of the contacts which is an objection to many forms of make-and-break devices.

Otherwise, the construction and operation is the same as above described.

I claim:

1. An electric flour sifter including a shell open at its lower end, a magnet supported within said shell, a housing enclosing the sides and top of the magnet, a flexible diaphragm connected at its periphery to the lower end of said housing, a vertically reciprocating core within the magnet said core being located through and connected to the central portion of said diaphragm, a sieve suspended from the core below the diaphragm, a normally closed make and break device for controlling the magnet, means upon the core for opening the make and break device on the up-stroke of the core and a leaf spring connected at its center to the sieve and having its ends engaged beneath the bottom of the shell for urging the core downward.

2. An electric flour sifter including a shell open at its lower end, a magnet supported within said shell, a housing enclosing the sides and top of the magnet, a flexible diaphragm connected at its periphery to the lower end of said housing, a vertically reciprocating core within the magnet said core being located through and connected to the central portion of said diaphragm, a sieve suspended from the core below the diaphragm, a spring arm above the magnet in the path of the reciprocating core, a normally closed electric make-and-break device operated by said spring arm for controlling the magnet, means upon the core for engaging the spring arm for opening the make and break device on the up-stroke of the core and a leaf spring connected at its center to the sieve and having its ends engaged beneath the bottom of the shell for urging the core downward.

3. An electric flour sifter including a shell open at its lower end, a magnet supported centrally within said shell, a housing enclosing the sides and top of the magnet, a flexible diaphragm connected at its periphery to the lower end of said housing, a vertically reciprocating core within the magnet said core being located through and connected centrally to said diaphragm, a sieve suspended centrally from the core below the diaphragm, means for de-energizing the magnet on the up-stroke of the core and a leaf spring connected at its center to the sieve and having its ends engaged beneath the bottom of the shell for urging the core downward.

4. An electric flour sifter including a shell open at its lower end, a magnet supported within said shell, a pole piece in the magnet, a vertically reciprocating core within the magnet, an armature carried by the core and arranged to contact the pole piece on the up-stroke, a stop suspended from the magnet for contact with the armature on the down stroke, a sieve suspended from the core within the lower end of the shell, a spring arm above the magnet in the path of the core, a normally closed make-and-break device operated by the spring arm for controlling the magnet, a finger on the core for contact with the spring arm for opening the make and break device on the up-stroke of the core and a leaf spring connected at its center to the sieve and having its ends engaged under the bottom of the shell for normally urging the armature against said stop.

5. An electric flour sifter including a shell open at its lower end, a magnet supported within said shell, a housing enclosing the top and sides of the magnet, a pole piece in the magnet, a vertically reciprocating core within the magnet, a flexible diaphragm connected at its periphery to the bottom of the magnet housing the core being located through and centrally connected to said diaphragm, an armature carried by the core and arranged to contact the pole piece on the up-stroke, a stop suspended from the magnet for contact with the armature on the down-stroke, a sieve suspended from the core within the lower end of the shell, a spring arm above the magnet in the path of the core, a normally closed make and break device operated by the spring arm for controlling the magnet, means on the core for engaging the spring arm for opening the make and break device on the up-stroke of the core and a leaf spring connected at its center to the sieve and having its ends engaged under the bottom of the shell for normally urging the armature against said stop.

ALBERT C. WILCOX.